(12) United States Patent
Schaefer

(10) Patent No.: US 11,928,023 B1
(45) Date of Patent: Mar. 12, 2024

(54) TECHNIQUES FOR INDICATING A WRITE LINK ERROR

(71) Applicant: Micron Technology, Inc., Boise, ID (US)

(72) Inventor: Scott E. Schaefer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/050,679

(22) Filed: Oct. 28, 2022

(51) Int. Cl.
*G06F 11/10* (2006.01)
*G06F 11/07* (2006.01)

(52) U.S. Cl.
CPC ...... *G06F 11/1048* (2013.01); *G06F 11/0793* (2013.01); *G06F 11/1068* (2013.01)

(58) Field of Classification Search
CPC ............ G06F 11/1048; G06F 11/0793; G06F 11/1068
USPC ............... 714/764, 768, 769, 773, 799, 800
See application file for complete search history.

(56) References Cited

U.S. PATENT DOCUMENTS

| | | | | |
|---|---|---|---|---|
| 2022/0399902 A1* | 12/2022 | Geiger | ............... | G06F 11/1048 |
| 2023/0061144 A1* | 3/2023 | Schaefer | ............ | G06F 11/0772 |
| 2023/0063494 A1* | 3/2023 | Schaefer | .......... | G11C 29/50004 |
| 2023/0072766 A1* | 3/2023 | Schaefer | ............... | G06F 11/073 |
| 2023/0231574 A1* | 7/2023 | Schaefer | ............... | H03M 13/43 714/753 |
| 2023/0305921 A1* | 9/2023 | Ayyapureddi | ...... | G06F 11/0772 714/764 |
| 2023/0315568 A1* | 10/2023 | Ayyapureddi | ........ | G06F 11/106 714/6.2 |

OTHER PUBLICATIONS

U.S. Appl. No. 17/889,982, by Schaefer, filed Aug. 17, 2022 (62 pages).

* cited by examiner

*Primary Examiner* — John J Tabone, Jr.
(74) *Attorney, Agent, or Firm* — Holland & Hart LLP

(57) ABSTRACT

Methods, systems, and devices for techniques for indicating a write link error are described. The method may include a memory device receiving, from a host device, a write command, data, and a first set of error control bits for the data. The memory device may determine that the data includes an uncorrectable error using the first set of error control bits and generate a second set of error control bits for the data based on determining that the data includes the uncorrectable error. Further, the method may include the memory device storing the data and the second set of error control bits in a memory device and transmitting, to the host device, the data and an indication that the data received from the host device included the uncorrectable error based on the second set of error control bits.

25 Claims, 5 Drawing Sheets

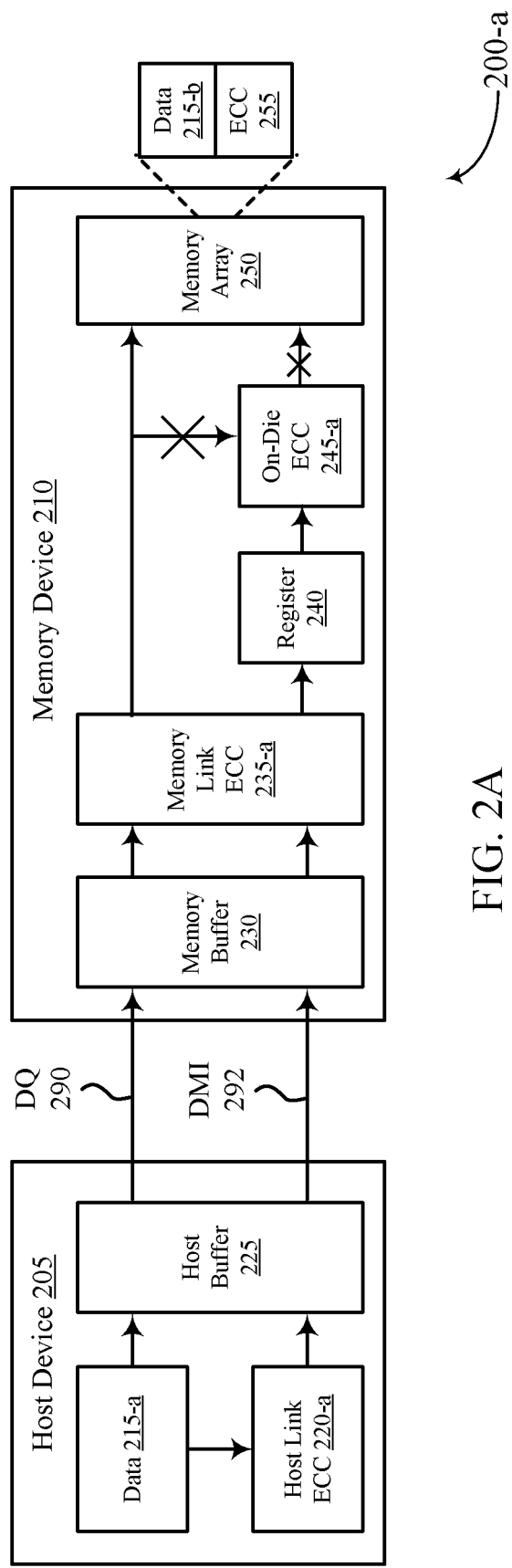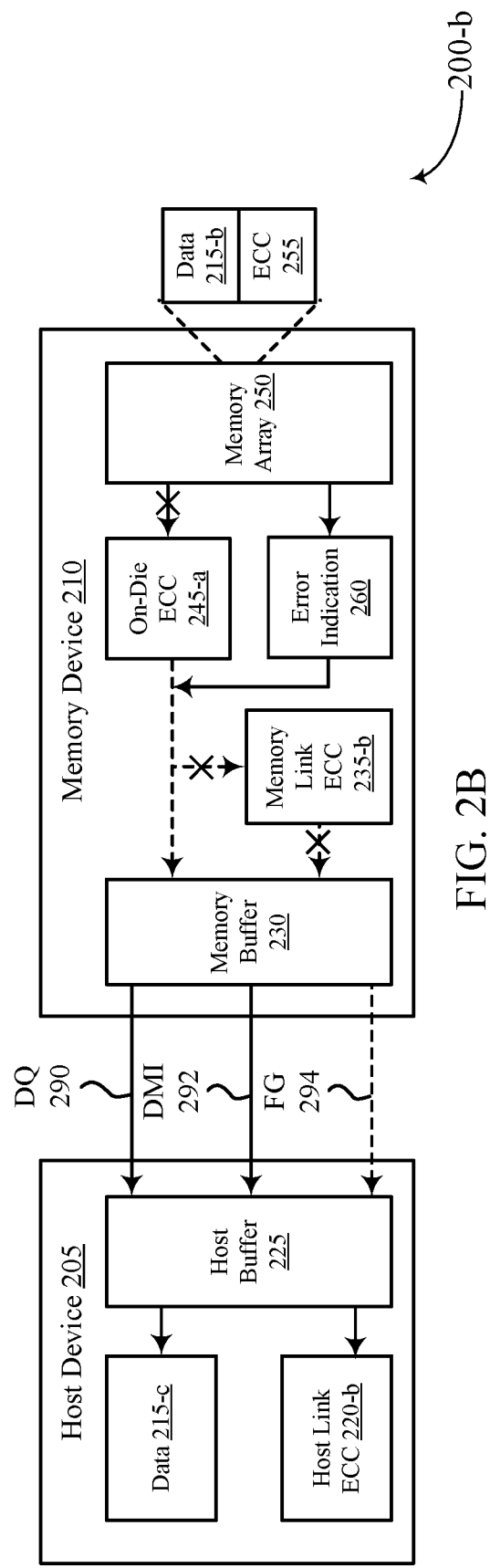
FIG. 2A
FIG. 2B

US 11,928,023 B1

TECHNIQUES FOR INDICATING A WRITE LINK ERROR

FIELD OF TECHNOLOGY

The following relates to one or more systems for memory, including techniques for indicating a write link error.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

BRIEF DESCRIPTION OF THE DRAWINGS

FIGS. 2A and 2B illustrate examples of a system that supports techniques for indicating a write link error in accordance with examples as disclosed herein.

DETAILED DESCRIPTION

Figure 1:
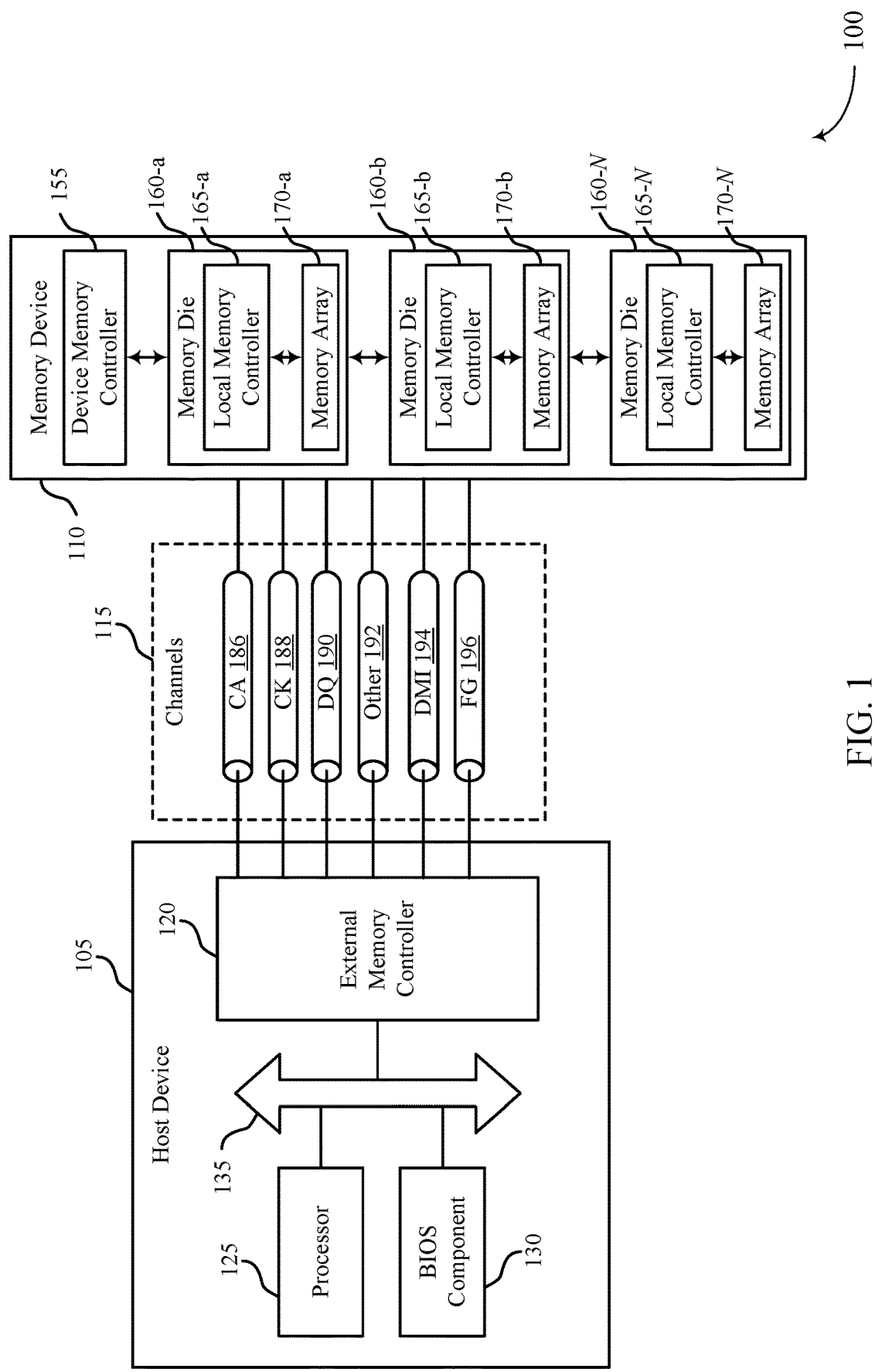
FIG. 1 illustrates an example of a system that supports techniques for indicating a write link error in accordance with examples as disclosed herein.

In some examples, one or both of a memory device or a host device may include error correction code (ECC) circuitry and utilize the ECC circuitry to correct errors in data. In some examples, there may be different types of ECC schemes such as on-die ECC or link-ECC. On-die ECC may provide protection for data stored within the memory device. Using the ECC circuitry, the memory device may internally compute ECC for write data and store the write data as well as the ECC in a memory array of the memory device. When the memory device receives a read command for the data, the memory device may read the data as well as the ECC stored in the memory array and compare the ECC against an ECC generated from the read data. If the ECCs match, there are no errors in the data. If the ECCs do not match, there may be one or more errors (e.g., a single bit error (SBE) or a multi-bit error (MBE)) in the data and the memory device may attempt to correct the one or more errors using the ECC circuitry.

Additionally or alternatively, link-ECC may provide protection for data being transferred between the memory device and the host device via one or more channels. In some examples, the host device may perform a write operation and write data to the memory device. In such example, the host device may generate ECC for the write data and transmit the ECC (e.g., using a data mask inversion (DMI) pin) along with the write data (e.g., using one or more DQ pins) to the memory device. Using the ECC circuitry, the memory device may generate ECC based on the received write data and compare the ECC to the received ECC. If the ECCs match, there are no errors in the write data. If the ECCs do not match, the write data may include one or more errors and the memory device may store error information (e.g., information indicating whether the error is a SBE or MBE or one or both of the ECCs) in one or more registers (e.g., MR43 register or MR44 register) of the memory device and the write data (e.g., the write data including the one or more errors) in a memory array of the memory device. When the host device transmits a read command for data (e.g., the write data stored in the memory array), the memory device may generate ECC for the read data and transmit the ECC (e.g., using a DMI pin) along with the read data (e.g., using one or more DQ pins) to the host device. Using the ECC circuitry, the host device may generate ECC based on the received read data and compare the ECC to the received ECC. If the ECCs match, there may be no errors in the read data. If the ECCs do not match, the read data may include one or more errors and the host device may attempt to correct the one or more errors using the ECC circuitry.

Additionally, upon receiving the read data, the host device may check to see if any errors occurred during a previous write operation associated with the read data. To do so, the host device may read the one or more registers of the memory device. If an error occurred over the link (e.g., while transferring the data from the host device to the memory device during a previous write operation), the register may store information related to the error (e.g., error information). As such, the host device may read the one or more registers every time the host device receives read data as part of a read operation to validate whether a write link error occurred or not. However, reading the one or more registers during every read operation may be time consuming and inefficient.

A potential solution is for the memory device to provide an indication of the write link error to the host device. As one example, the memory device may provide this indication by poisoning the corresponding ECC bits and the data. For example, the memory device may receive write data from the host device as part of a write operation and determine that the write data includes one or more uncorrectable errors (e.g., using link-ECC). Upon determining that the write data includes one or more uncorrectable errors, the memory device may overwrite the ECC corresponding to the data (e.g., on-die ECC) such that each bit of the ECC has a logic value of 1 and overwrite the data such that each bit of the data has a logic value of 1. During a read operation for the data, the memory device may transmit the poisoned ECC and the poisoned read data to the host device. When the host device receives the poisoned read data and the poisoned ECC, the host device may be able to identify that the read data includes the one or more errors (e.g., resulting from the write link error).

However, the above solution may be problematic. For example, poisoning the data and the corresponding ECC bits may require the host device to not rely on all is as valid data. Additionally, the above method may be vulnerable to single-bit errors (SBEs). For example, if the data includes a SBE (e.g., one bit of the data has a logic value of 0 instead of 1), the memory device may invert a different bit of the data because the poisoned ECC bit may point to the second bit being the SBE instead of the one bit. As a result, the data transmitted to the host device may include an MBE (e.g., two bits having a logic value of 0 instead of 1). Because the data no longer includes all Is, the host device may be unable to identify that a write link error occurred. Additionally, poisoning the data and the corresponding ECC bits may restrict the host device from potentially correcting the write link errors (e.g., using ECC techniques such as Reed-Solomon).

As described herein, the memory device may implicitly or explicitly indicate that a write link error occurred to the host device. In one example, the memory device may provide this indication by poisoning ECC bits corresponding to the data. For example, the memory device may receive write data from the host device as part of a write operation and determine that the write data includes one or more errors (e.g., using link-ECC). Upon determining that the write data includes one or more errors, the memory device may overwrite the ECC corresponding to the data (e.g., on-die ECC) such that each bit of the ECC has a logic value of 1 and store the ECC as well as the write data (e.g., including the one or more errors) in the memory array of the memory device. In one example, during a read operation for the data, the memory device may transmit the read data and the poisoned ECC to the host device. When the host device receives the read data and the poisoned ECC, the host device may be able to identify that the read data includes the one or more errors.

In another example, as part of the read operation, the memory device may read the data and the poisoned ECC bits from the memory array of the memory device and generate a flag (e.g., a write link ECC error flag) based on the poisoned ECC bits. The flag may indicate that the data included one or more uncorrectable errors as received based on the link-ECC. The memory device may then transmit the read data (e.g., using one or more DQ pins) and the flag to the host device and the host device may identify that the read data includes the one or more errors upon receiving the flag. In some examples, in response to identifying that a write link error occurred, the host device may read the one or more registers of the memory device to determine which type of write link error occurred (e.g., a SBE or an MBE) and attempt to correct the one or more errors included in the data using the ECC circuitry. Using the methods as described herein would allow the host device identify a write link error without reading the one or more register, which may reduce latency and inefficiency. Additionally, by poisoning the ECC bits (e.g., as opposed to the payload), the host device may potentially correct the one or more errors included in the data.

Features of the disclosure are initially described in the context of systems and dies as described with reference to FIGS. 1, 2A, and 2B. Features of the disclosure are described in the context of circuitry as described with reference to FIG. 3. These and other features of the disclosure are further illustrated by and described with reference to an apparatus diagram and flowcharts that relate to techniques for indicating a write link error as described with reference to FIGS. 4 and 5.

FIG. 1 illustrates an example of a system 100 that supports techniques for indicating a write link error in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may communicate information (e.g., data, commands, or both) with the host device 105. For example, the memory device 110 may receive a write command indicating that the memory device 110 is to store data received from the host device 105, or receive a read command indicating that the memory device 110 is to provide data stored in a memory die 160 to the host device 105, among other types of information communication.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths (e.g., eight or nine signal paths) to communicate control information (e.g., commands or addresses).

In some examples, clock signal channels 188 may be operable to communicate one or more clock signals between the host device 105 and the memory device 110. Clock signals may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal may be referred to as a control clock signal, a command clock signal, or a system clock signal. A system clock signal may be generated by a system clock, which may include one or more hardware components (e.g., oscillators, crystals, logic gates, transistors).

In some examples, data channels 190 may be operable to communicate information (e.g., data, control information) between the host device 105 and the memory device 110. For example, the data channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be x4 (e.g., including four signal paths), x8 (e.g., including eight signal paths), x16 (including sixteen signal paths), etc.

In some examples, the one or more other channels 192 may include one or more error detection code (EDC) channels. The EDC channels may be operable to communicate error detection signals, such as checksums, to improve system reliability. An EDC channel may include any quantity of signal paths. Alternatively or additionally, the channels 115 may include DMI channels 194 which may be operable to communicate ECC between the host device 105 and the memory device 110. Further, the channels 115 may include FG channels 196 which may be operable to communicate one or more flags associated with link error detection between the host device 105 and the memory device 110.

Signals communicated over the channels 115 may be modulated using one or more different modulation schemes. In some examples, a binary-symbol (or binary-level) modulation scheme may be used to modulate signals communicated between the host device 105 and the memory device 110. A binary-symbol modulation scheme may be an example of a M-ary modulation scheme where M is equal to two. A symbol of a binary-symbol modulation scheme may be operable to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and others.

As described herein, the memory device 110 may transmit an indication that data received from memory device 110 includes an uncorrectable error. An uncorrectable error may otherwise be known as a write link error. A write link error may be an error in write data that occurs when the host device 105 transmits the write data to the memory device 110 during a write operation. The write link error may be considered uncorrectable because the memory device 110 may not have the capability to correct the error using its ECC circuitry. Instead, in some examples, the capability to correct the write link error may lie with the host device 105. On-die errors such as errors in the write data that occur when the memory device 110 writes the write data to a memory array 170 may be known as correctable errors because the memory device 110 may have the capability to correct the error using its ECC circuitry.

In some examples, the host device 105 may perform a write operation on the memory device 110. During the write operation, the host device 105 may generate a first set of error control bits associated with write data and transmit, to the memory device 110, the first set of error control bits using a DMI channel 194 and the write data using the DQ channels 190. The memory device 110 (e.g., the device memory controller 155 or the local memory controller 165) may generate a second set of error control bits using the received write data and compare the first set of error control bits to the second set of error control bits. In one example, the first set of error control bits and the second set of error control bits may not match and as such, the memory device 110 may identify that the write data includes an uncorrectable error and in response, store error information in a register of the memory device 110. The error information may indicate a type of uncorrectable error is included in the data.

Further, in response to detecting the uncorrectable error, the memory device 110 (e.g., the device memory controller 155 or the local memory controller 165) may generate a third set of error control bits and store the third set of error control bits along with the write data (e.g., the write data including the uncorrectable error) in a memory array 170. Each bit of the third set of error control bits may have a first logic value (e.g., a logic value of 1) regardless of the logic values of the write data. A set of error control bits including bits of a same logic value of 1 may point to a phantom error code (e.g., an error code 255). Upon receiving a read command for the data (e.g., the write data stored in the memory array 170), the memory device 110 may read the data and the third set of error control bits from the memory array 170 and identify that the read data includes the uncorrectable error based on the third set of error control bits including bits of a same logic value (e.g., a logic value of 1).

In some examples, the memory device 110 may transmit, to the host device 105, the read data using the DQ channels 190 and the third set of error control bits using the DMI channel 194. The host device 105 may receive the third set of error control bits and the read data and determine that the read data includes the uncorrectable error based on the third set of error control bits including all bits of the first logic type (e.g., a logic value of 1). Upon detecting that the read data includes the uncorrectable error, the host device 105 may read the error information stored in the register of the memory device 110 to determine the type of uncorrectable error (e.g., determine whether the uncorrectable error is a SBE or an MBE). Alternatively, the memory device 110 may generate a flag in response to identifying that the read data includes the uncorrectable error and transmit, to the host device 105, the read data using the DQ channels 190 and the flag using an FG channel 196 (e.g., a channel different from the DMI channel 194). In such example, the host device 105 may determine the read data includes the uncorrectable error based on receiving the flag and subsequently, the host device 105 may read the error information stored in the register of the memory device to determine the type of uncorrectable error (e.g., determine whether the uncorrectable error is a SBE or an MBE). The host device may then attempt to correct the uncorrectable error (e.g., using its ECC circuitry).

In some examples, the third set of error control bits may be susceptible to SBEs. That is, a bit of the third set of error control bits may be inverted from a logic value of 1 to a logic value of 0 (e.g., when the memory device 110 reads the third set of error control bits from the memory array or when the memory device 110 transfers the third set of error control bits to the host device 105). A set of error control bits including bits of a logic value of 1 except for one bit may point to an MBE. In some examples, one or both of the memory device 110 or the host device 105 may gate sets of error control bits that include either all bits of a logic value of 1 or include all bits of a logic value of 1 except for one bit such that if the memory device 110 or the host device 105 encounters any of these sets of error control bits, the memory device 110 or the host device 105 may generate a phantom error code. As described above, in response to the phantom error code, the memory device 110 may generate a flag or transmit the third set of error control bits to the host device 105 along with the read data. In response to receiving the flag or the third set of error control bits, the host device 105 may read the register of the memory device 110 to determine whether a link error occurred. If host device 105 determines that a link error did not occur and the third set of error control bits includes all bits of a logic value of 1 except for one bit, the host device 105 may determine that the data includes an MBE error as opposed to the link error.

FIGS. 2A and 2B illustrate examples of a system 200 (e.g., a system 200-a and a system 200-b) that supports techniques for indicating a write link error in accordance with examples as disclosed herein. The systems 200 may include a host device 205 and a memory device 210, which may be examples of a host device 105 and a memory device 110 as described with reference to FIG. 1. The memory device 210 may include a memory buffer 230, link ECC circuitry, on-die ECC circuitry, a register 240, and a memory array 250. The memory device 210 may also include a controller which may be an example of a device memory controller 155 as described with reference to FIG. 1 and in some examples, the controller may include one or more of the memory buffer 230, the link ECC circuitry, the on-die ECC circuitry, or the register 240. The host device 205 may include a host buffer 225 and link ECC circuitry. The host device 205 may also include a controller which may be an example of an external memory controller 120 as described with reference to FIG. 1 and in some examples, the controller may include one or both of the host buffer 225 or the link ECC circuitry.

As described in FIG. 1, the memory device 210 may indicate (e.g., either implicitly or explicitly) to a host device 205 that a write link error has occurred. As shown in FIG. 2A, the host device 205 may perform a write operation on the memory device 210. During the write operation, the host device 205 may generate host link ECC 220-a for data 215-a using the ECC circuitry and store the data 215-a along with the host link ECC 220-a in the host buffer 225. The host link ECC 220-a may include a set of parity bits, where each parity bit corresponds to a portion of the data 215-a. A logic value of the parity bit may depend on a quantity of bits in the corresponding portion of the data 215-a that has a first logic value (e.g., a logic value of 1) as opposed to a second logic value (e.g., logic value of 0).

The host device 205 may then transmit, to the memory device 210, the data 215-a over the DQ channels 290 and the host link ECC 220-a over the DMI channel 292. The memory device 210 may store the host link ECC 220-a and the data 215-a in the memory buffer 230 until the data 215-a is ready to be stored in the memory array 250. Prior to being stored in the memory array 250, the memory device 210 may check the data 215-a for a write link error (e.g., an error that may occur when transferring the data 215-a from the host device 205 to the memory device 210). The memory device 210 may generate memory link ECC 235-a for the data 215-a and compare the memory link ECC 235-a to the host link ECC 220-a. In one example, the memory link ECC 235-a may not match the host link ECC 220-a indicating that a link error has occurred (e.g., either a SBE or an MBE). As such, the data 215-a may include one or more errors resulting in data 215-b.

In some examples, the memory device 210 may be unable to correct the link error and may store error information in a register 240. In some examples, the error information may include one or more of an indication that the data 215-b includes one or more errors, the memory link ECC 235-a, or the host link ECC 220-a. In some examples, the memory device 210 may process multiple write commands. As such, the memory device 210 may store a task tag along with the error information such that the host device 205 may differentiate error information associated with different write commands and different sets of data. In some examples, upon detecting that a link error has occurred, the memory device 210 may bypass the on-die ECC circuitry. That is, instead of generating on-die ECC 245-a using the data 215-b, the memory device 210 may generate ECC 255 that includes a set of parity bits, where each parity bits has a first logic value (e.g., a logic value of 1). The memory device 210 may store the data 215-b and the ECC 255 in the memory array 250. In some example, the memory device 210 may store the data 215-b in a first portion of the memory array 250 and the ECC 255 in a second portion of the memory array 250 different from the first portion of the memory array 250.

In some examples, as shown in FIG. 2B, the host device 205 may perform a read operation on the memory device 210. The read operation may be for the data 215-b stored at the memory array 250. During the read operation, the memory device 210 may read the data 215-b and the ECC 255 from the memory array 250. The memory device 210 may then determine whether a link ECC error occurred based on the ECC 255. For example, the memory device 210 may AND or combine the set of parity of the ECC 255 and generate an error code. If the error code is a phantom error code (e.g., error code 255), the memory device 210 may determine a link ECC error occurred and that the data 215-*b* includes one or more errors. The memory device 210 may determine a phantom error code if all of the parity bits of the set of parity bits of the ECC 255 are a first logic value (e.g., a logic value of 1). Upon determining a write link error has occurred, the memory device 210 may potentially generate an error indication 260. In one example, the error indication 260 may be an error flag. In some examples, the error flag may be a single bit flag and the memory device 210 may set the single bit to a first logic value if the write link error is detected or a second logic value if a write link error is not detected.

In some examples, the memory device 210 may bypass one or both of the on-die ECC circuitry or the link ECC circuitry. That is, the memory device 210 may not generate on-die ECC 245-*b* for error correction of the data 215-*b* using the on-die ECC circuitry or the memory device may not generate memory link ECC 235-*b* for error correction of the data 215-*b* using the link ECC circuitry. Instead, in one example, the memory device 210 may store the ECC 255 and the data 215-*b* in the memory buffer 230 until the data 215-*b* and the ECC 255 is ready to be transferred to the host device 205. When ready, the memory device 210 may transmit the data 215-*b* to the host device 205 using the DQ channel 290 and transmit the ECC 255 to the host device 205 using the DMI channel 292.

The host device 205 may store the data 215-*b* and the ECC 255 in the host buffer 225. In some examples, the host device 205 may check the fidelity of the data 215-*b*. For example, the host device 205 may AND or combine the set of parity bit of the ECC 255 (e.g., using the link ECC circuitry) and generate an error code. If the error code is a phantom error code (e.g., error code 255), the host device 205 may determine a link ECC error occurred and that the data 215-*b* includes one or more errors. The host device 205 may determine a phantom error code if all of the parity bits of the set of parity bits of the ECC 255 are a first logic value (e.g., a logic value of 1). Upon determining a link error has occurred, the memory device 210 may read the register 240. The register 240 may store error information corresponding to the write link error. Using the error information, the host device 205 may potentially correct the one or errors included in the data 215-*c* (e.g., using the link ECC circuitry) resulting in the data 215-*c*.

In another example, the memory device 210 may store the error indication 260 (e.g., the error flag) and the data 215-*b* in the memory buffer 230 until the data 215-*b* and the error indication 260 is ready to be transferred to the host device 205. When ready, the memory device 210 may transmit the data 215-*b* to the host device 205 using the DQ channel 290 and transmit the error indication 260 to the host device 205 using the FG channel 296. The FG channel 296 may be different from the DQ channel 290 and the DMI channel 292.

The host device 205 may store the data 215-*b* and the error indication 260 in the host buffer 225. In some examples, the host device 205 may identify that a link error has based on the error indication 260 (e.g., if the logic value of the error flag is the first logic value). Upon determining a link error has occurred, the memory device 210 may read the register 240. The register 240 may store error information corresponding to the link error. Using the error information, the host device 205 may potentially correct the one or errors included in the data 215-*c* (e.g., using the link ECC circuitry) resulting in the data 215-*c*. using the methods as described herein, the host device 205 may determine a write link error occurred without reading the register 240 which may reduce latency and in some example, the methods as described herein may allow the host device 205 to correct errors in read data resulting from a link error.

Figure 3:
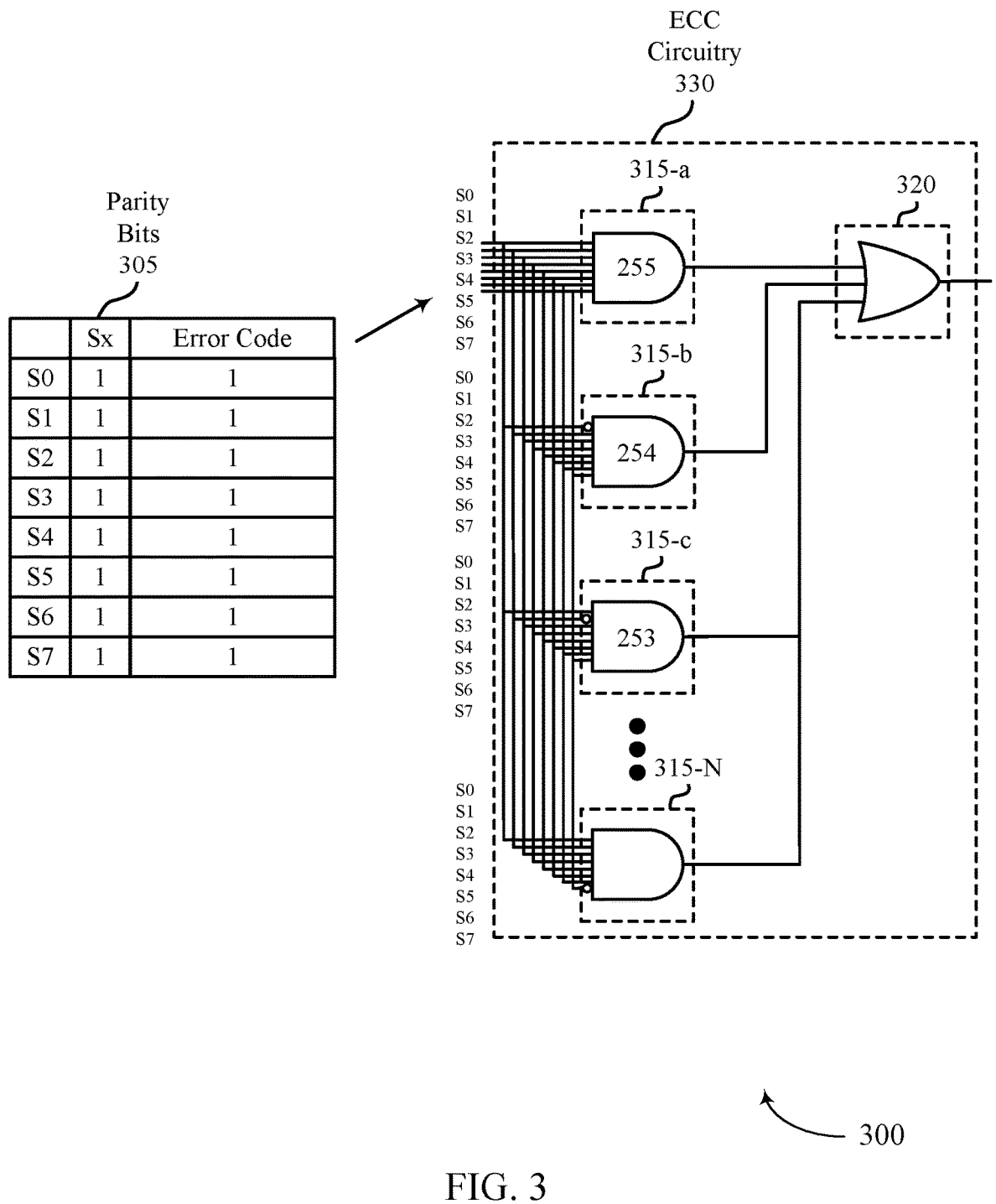
FIG. 3 illustrates an example of circuitry that supports techniques for indicating a write link error in accordance with examples as disclosed herein.

FIG. 3 illustrates an example of circuitry 300 that supports techniques for indicating a write link error in accordance with examples as disclosed herein. In some examples, the circuitry 300 may be implemented by a memory device 110 or a host device 105 as described with reference to FIG. 1. In another example, the circuitry 300 may be implemented by a memory device 210 or a host device 205 as described with reference to FIGS. 2A and 2B.

As described with reference to FIG. 2A, during a write operation, a memory device may detect a write link error has occurred and that write data has one or more uncorrectable errors (e.g., uncorrectable to the memory device). Upon detecting the write link error, the memory device may generate a set of parity bits 305. In some examples, the set of parity bits 305 may include eight bits (e.g., bits S0 through S7). Each bit of the set of parity bits 305 may correspond to a portion of data received over a single DQ pin. For example, the bit, S0, may correspond to a portion of the data received over a first DQ pin, the bit, S1, may correspond to a portion of the data received over a second DQ pin, the bit, S2, may correspond to a portion of the data received over a this DQ pin, and so on. In some examples, in response to detecting the write link error, the memory device may set all of the bits (e.g., bits S0 through S7) included in the set of parity bits 305 to a logic value of 1 and store the set of parity bits 305 in a memory array of the memory device along with the write data.

During a read operation, the memory device may read the set of parity bits 305 from the memory array. That is, the memory device may read a logic state of each bit included in the set of parity bits 305. Upon reading the set of parity bits 305, the memory device may input the set of parity bits 305 into the ECC circuitry 330 to determine an error code. Error codes may indicate a type of error included in the read data (e.g., a SBE or an MBE) and a location of the bit or bits in the read data that are to be corrected such that the memory device may correct the error or errors.

In some examples, the ECC circuitry 330 may include logic gates 315 which may be examples of AND gates that output different error codes for different sets of parity bits 305. For example, the logic gate 315-*a* may output a phantom error code (e.g., an error code 255) if the bits S0 through S7 have a logic value of 1, the logic gate 315-*b* may output an MBE error code (e.g., an error code 254) if the bit S0 has a logic value of 0 and the bits S2 through S7 have a logic value of 1, and the logic gate 315-*c* may output an MBE error code (e.g., an error code 253) if the bit S1 has a logic value of 0 and the bits S0 and S2 through S7 have a logic value of 1. As an example, the parity bits 305 for a 255 error code may include 11111111, the parity bits 305 for a 254 error code may include 01111111, and the parity bits for a 253 error code may include 10111111. Further, the ECC circuitry 330 may include additional logic gates 315 not shown in FIG. 3 (e.g., logic gates 315-N). For example, the ECC circuitry 330 may include one or more additional logic gates 315 that output an MBE error code (e.g., any logic gate 315 whose input is a set of parity bits having all is except for one bit or whose output is an error code 251, an error code 247, an error code 239, an error code 223, an error code 191, or an error code 127). In such examples, the ECC circuitry 330 may be configured to detect whether a single bit err exists in the set of parity bits. Further, in some examples, the outputs of the logic gates 315 may be coupled to logic gate 320 which may be an example of a OR gate that outputs a phantom error code. As such, any MBE error code may equate to a phantom error code.

In one example, the set of parity bits read from the memory array may not include any errors. For example, the memory device may determine (e.g., from the read operation) that all of the bits of the set of parity bits 305 may have a logic value of 1. In such example, the output of the ECC circuitry 330 may be a phantom error code. In another example, the set of parity bits read from the memory array may include a SBE. That is, all of bits of the set of parity bits 305 may have a logic value of 1 except for one bit of the set of parity bits 305 may have a logic value of 0. In such example, the output of the ECC circuitry may additionally be phantom code. In response to the output of the ECC circuitry being a phantom code, the memory device may determine that the read data has one or more uncorrectable errors (e.g., either a link error or an MBE error) and may either transmit (e.g., forward) the set of parity bits 305 to the host device.

In some examples, the host device may include the same ECC circuitry 330. Upon receiving the set of parity bits 305 from the memory device during the read operation, the host device may input the set of parity bits 305 into the ECC circuitry 330. In one example, the set of parity bits 305 received from the memory device may not include any errors. For example, the host device may determine (e.g., from the read operation) that all of the bits of the set of parity bits 305 may have a logic value of 1. In such example, the output of the ECC circuitry 330 may be a phantom error code. In another example, the set of parity bits received from the memory device may include a SBE. That is, all of bits of the set of parity bits 305 may have a logic value of 1 except for one bit of the set of parity bits 305 may have a logic value of 0. In such example, the output of the ECC circuitry may additionally be a phantom code. In response to the output of the ECC circuitry 330 being an phantom code, the host device may determine that the read data has one or more uncorrectable errors and read a register at the memory device to determine the type of uncorrectable error. If the uncorrectable error is a link error, the register may store error information related to the link error. If the uncorrectable error is an MBE resulting from the memory device reading the data from the memory array or the memory device transmitting the data to the host device (e.g., as opposed to a link error), the register may not store error information. In some examples, upon determining the type of uncorrectable error, the host device may attempt to correct the uncorrectable error.

Figure 4:
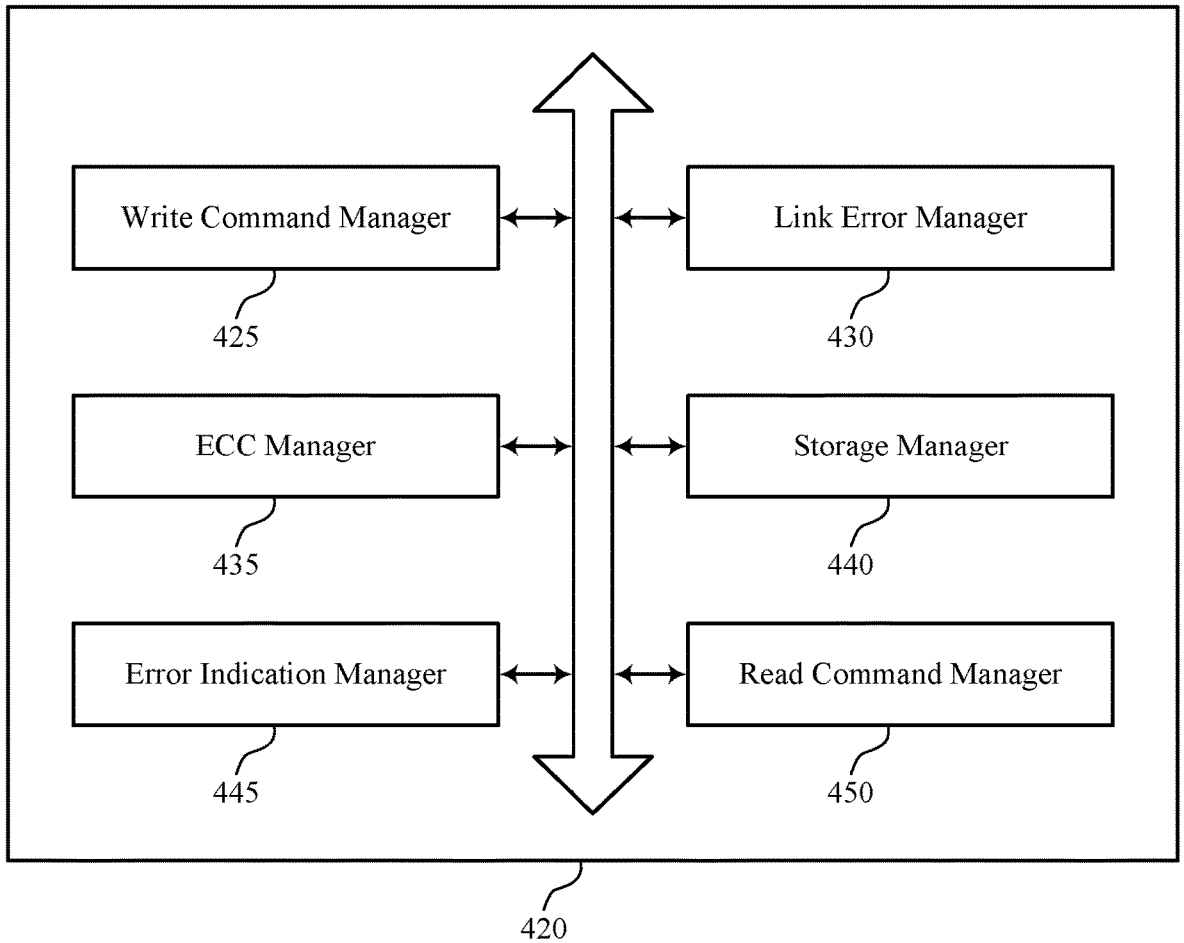
FIG. 4 shows a block diagram of a memory device that supports techniques for indicating a write link error in accordance with examples as disclosed herein.

FIG. 4 shows a block diagram 400 of a memory device 420 that supports techniques for indicating a write link error in accordance with examples as disclosed herein. The memory device 420 may be an example of aspects of a memory device as described with reference to FIGS. 1 through 3. The memory device 420, or various components thereof, may be an example of means for performing various aspects of techniques for indicating a write link error as described herein. For example, the memory device 420 may include a write command manager 425, a link error manager 430, a ECC manager 435, a storage manager 440, an error indication manager 445, a read command manager 450, or any combination thereof. Each of these components may communicate, directly or indirectly, with one another (e.g., via one or more buses).

The write command manager 425 may be configured as or otherwise support a means for receiving, from a host device, a write command, data, and a first set of error control bits for the data, the data and the first set of error control bits being associated with the write command. The link error manager 430 may be configured as or otherwise support a means for determining that the data includes an uncorrectable error using the first set of error control bits in response to receiving the data and the first set of error control bits. The ECC manager 435 may be configured as or otherwise support a means for generating a second set of error control bits for the data based at least in part on determining that the data includes the uncorrectable error, where the second set of error control bits indicate that the data received from the host device included the uncorrectable error. The error indication manager 445 may be configured as or otherwise support a means for transmitting, to the host device, the data and an indication that the data received from the host device included the uncorrectable error based at least in part on the second set of error control bits.

In some examples, to support transmitting the indication that the data received from the host device included the uncorrectable error, the error indication manager 445 may be configured as or otherwise support a means for transmitting, to the host device, the second set of error control bits over a channel associated with communicating error control information.

In some examples, the error indication manager 445 may be configured as or otherwise support a means for generating a single bit indicator flag based at least in part on the second set of error control bits, where the indication that the data received from the host device included the uncorrectable error includes the single bit indicator flag.

In some examples, to support transmitting the indication that the data received from the host device included the uncorrectable error, the error indication manager 445 may be configured as or otherwise support a means for transmitting the indication that the data received from the host device included the uncorrectable error via a first channel, the first channel different from a data channel and a channel associated with communicating error control information.

In some examples, the read command manager 450 may be configured as or otherwise support a means for receiving, from the host device, a read command for the data, where transmitting the data and the indication that the data received from the host device included the uncorrectable error is based at least in part on the read command.

In some examples, the link error manager 430 may be configured as or otherwise support a means for storing a bit at a register of the memory device, where a logic value of the bit is based at least in part on determining that the data includes the uncorrectable error.

In some examples, the read command manager 450 may be configured as or otherwise support a means for reading the second set of error control bits stored in the memory device as part of a read operation performed on the data. In some examples, the link error manager 430 may be configured as or otherwise support a means for reading the logic value of the bit stored at the register based at least in part on the second set of error control bits indicating the uncorrectable error, where transmitting the indication that the data received from the host device included the uncorrectable error is based at least in part on the logic value.

In some examples, the read command manager 450 may be configured as or otherwise support a means for reading data from the memory device as part of a read operation performed on the data. In some examples, the link error manager 430 may be configured as or otherwise support a means for refraining from performing an error correction procedure on the data read from the memory device based at least in part on the second set of error control bits.

In some examples, the storage manager 440 may be configured as or otherwise support means for storing the data and the second set of error control bits in a memory system. In some examples, each bit of the second set of error control bits corresponds to a first logic value. In some examples, each bit of a first subset of the second set of error control bits is a first logic value and each bit of a second subset of the second set of error control bits is a second logic value, the second subset including one bit.

In some examples, the first set of error control bits is for correcting errors associated with the data received from a host device over a link and the second set of error control bits is for correcting errors associated with reading data stored at the memory device or for correcting errors associated with data sent to the host device over the link. In some examples, the uncorrectable error includes an MBE in the data.

Figure 5:
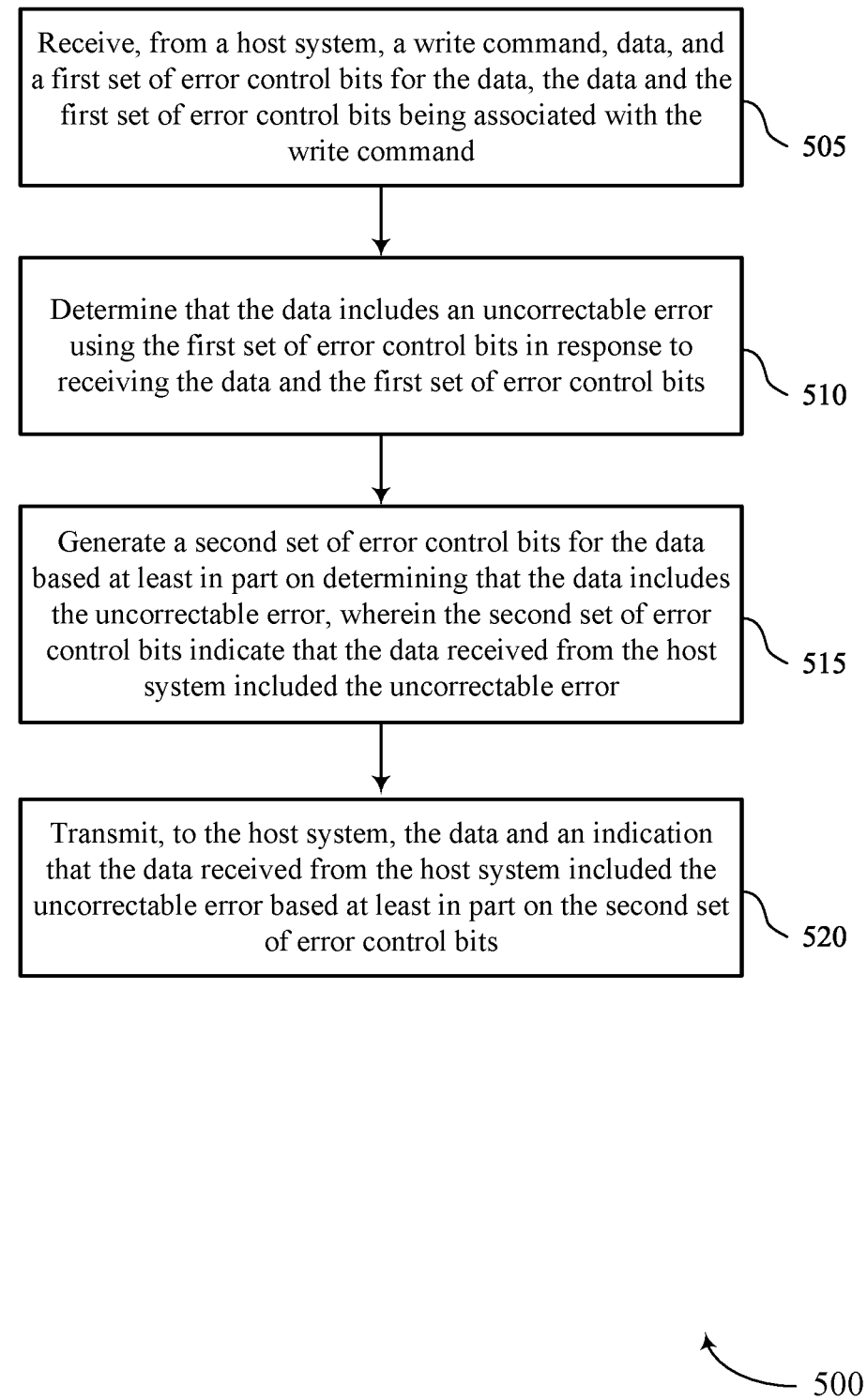
FIG. 5 shows a flowchart illustrating a method or methods that support techniques for indicating a write link error in accordance with examples as disclosed herein.

FIG. 5 shows a flowchart illustrating a method 500 that supports techniques for indicating a write link error in accordance with examples as disclosed herein. The operations of method 500 may be implemented by a memory device or its components as described herein. For example, the operations of method 500 may be performed by a memory device as described with reference to FIGS. 1 through 4. In some examples, a memory device may execute a set of instructions to control the functional elements of the device to perform the described functions. Additionally, or alternatively, the memory device may perform aspects of the described functions using special-purpose hardware.

At 505, the method may include receiving, from a host device, a write command, data, and a first set of error control bits for the data, the data and the first set of error control bits being associated with the write command. The operations of 505 may be performed in accordance with examples as disclosed herein. In some examples, aspects of the operations of 505 may be performed by a write command manager 425 as described with reference to FIG. 4.

At 510, the method may include determining that the data includes an uncorrectable error using the first set of error control bits in response to receiving the data and the first set of error control bits. The operations of 510 may be performed in accordance with examples as disclosed herein. In some examples, aspects of the operations of 510 may be performed by a link error manager 430 as described with reference to FIG. 4.

At 515, the method may include generating a second set of error control bits for the data based at least in part on determining that the data includes the uncorrectable error, where the second set of error control bits indicate that the data received from the host device included the uncorrectable error. The operations of 515 may be performed in accordance with examples as disclosed herein. In some examples, aspects of the operations of 515 may be performed by a ECC manager 435 as described with reference to FIG. 4.

At 520, the method may include transmitting, to the host device, the data and an indication that the data received from the host device included the uncorrectable error based at least in part on the second set of error control bits. The operations of 520 may be performed in accordance with examples as disclosed herein. In some examples, aspects of the operations of 520 may be performed by an error indication manager 445 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, from a host device, a write command, data, and a first set of error control bits for the data, the data and the first set of error control bits being associated with the write command; determining that the data includes an uncorrectable error using the first set of error control bits in response to receiving the data and the first set of error control bits; generating a second set of error control bits for the data based at least in part on determining that the data includes the uncorrectable error, where the second set of error control bits indicate that the data received from the host device included the uncorrectable error; and transmitting, to the host device, the data and an indication that the data received from the host device included the uncorrectable error based at least in part on the second set of error control bits.

Aspect 2: The method, apparatus, or non-transitory computer-readable medium of aspect 1, where transmitting the indication that the data received from the host device included the uncorrectable error includes operations, features, circuitry, logic, means, or instructions, or any combination thereof for transmitting, to the host device, the second set of error control bits over a channel associated with communicating error control information.

Aspect 3: The method, apparatus, or non-transitory computer-readable medium of any of aspects 1 through 2, further including operations, features, circuitry, logic, means, or instructions, or any combination thereof for generating a single bit indicator flag based at least in part on the second set of error control bits, where the indication that the data received from the host device included the uncorrectable error includes the single bit indicator flag.

Aspect 4: The method, apparatus, or non-transitory computer-readable medium of any of aspects 1 through 3, where transmitting the indication that the data received from the host device included the uncorrectable error includes operations, features, circuitry, logic, means, or instructions, or any combination thereof for transmitting the indication that the data received from the host device included the uncorrectable error via a first channel, the first channel different from a data channel and a channel associated with communicating error control information.

Aspect 5: The method, apparatus, or non-transitory computer-readable medium of any of aspects 1 through 4, further including operations, features, circuitry, logic, means, or instructions, or any combination thereof for receiving, from the host device, a read command for the data, where transmitting the data and the indication that the data received from the host device included the uncorrectable error is based at least in part on the read command.

Aspect 6: The method, apparatus, or non-transitory computer-readable medium of any of aspects 1 through 5, further including operations, features, circuitry, logic, means, or instructions, or any combination thereof for storing a bit at a register of the memory device, where a logic value of the bit is based at least in part on determining that the data includes the uncorrectable error.

Aspect 7: The method, apparatus, or non-transitory computer-readable medium of aspect 6, further including operations, features, circuitry, logic, means, or instructions, or any combination thereof for reading the second set of error control bits stored in the memory device as part of a read operation performed on the data and reading the logic value of the bit stored at the register based at least in part on the second set of error control bits indicating the uncorrectable error, where transmitting the indication that the data received from the host device included the uncorrectable error is based at least in part on the logic value.

Aspect 8: The method, apparatus, or non-transitory computer-readable medium of any of aspects 1 through 7, further including operations, features, circuitry, logic, means, or instructions, or any combination thereof for reading data from the memory device as part of a read operation performed on the data and refraining from performing an error correction procedure on the data read from the memory device based at least in part on the second set of error control bits.

Aspect 9: The method, apparatus, or non-transitory computer-readable medium of any of the aspects 1 through 8, further including operations, features, circuitry, logic, means, or instructions, or any combination thereof for storing the data and the second set of error control bits in a memory system.

Aspect 10: The method, apparatus, or non-transitory computer-readable medium of any of aspects 1 through 9, where each bit of the second set of error control bits corresponds to a first logic value.

Aspect 11: The method, apparatus, or non-transitory computer-readable medium of any of aspects 1 through 9, where each bit of a first subset of the second set of error control bits is a first logic value and each bit of a second subset of the second set of error control bits is a second logic value, the second subset including one bit.

Aspect 12: The method, apparatus, or non-transitory computer-readable medium of any of aspects 1 through 11, where the first set of error control bits is for correcting errors associated with the data received from a host device over a link and the second set of error control bits is for correcting errors associated with reading data stored at the memory device or for correcting errors associated with data sent to the host device over the link.

Aspect 13: The method, apparatus, or non-transitory computer-readable medium of any of aspects 1 through 12, where the uncorrectable error includes an MBE in the data.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   receiving, from a host device, a write command, data, and a first set of error control bits for the data, the data and the first set of error control bits being associated with the write command;
   determining that the data includes an uncorrectable error using the first set of error control bits in response to receiving the data and the first set of error control bits;
   generating a second set of error control bits for the data based at least in part on determining that the data includes the uncorrectable error, wherein the second set of error control bits indicate that the data received from the host device included the uncorrectable error; and
   transmitting, to the host device, the data and an indication that the data received from the host device included the uncorrectable error based at least in part on the second set of error control bits.

2. The method of claim 1, wherein transmitting the indication that the data received from the host device included the uncorrectable error comprises:
   transmitting, to the host device, the second set of error control bits over a channel associated with communicating error control information.

3. The method of claim 1, further comprising:
   generating a single bit indicator flag based at least in part on the second set of error control bits, wherein the indication that the data received from the host device included the uncorrectable error comprises the single bit indicator flag.

4. The method of claim 1, wherein transmitting the indication that the data received from the host device included the uncorrectable error comprises:
   transmitting the indication that the data received from the host device included the uncorrectable error via a first channel, the first channel different from a data channel and a channel associated with communicating error control information.

5. The method of claim 1, further comprising:

receiving, from the host device, a read command for the data, wherein transmitting the data and the indication that the data received from the host device included the uncorrectable error is based at least in part on the read command.

6. The method of claim 1, further comprising:
storing a bit at a register of a memory device, wherein a logic value of the bit is based at least in part on determining that the data includes the uncorrectable error.

7. The method of claim 6, further comprising:
reading the second set of error control bits stored in the memory device as part of a read operation performed on the data; and
reading the logic value of the bit stored at the register based at least in part on the second set of error control bits indicating the uncorrectable error, wherein transmitting the indication that the data received from the host device included the uncorrectable error is based at least in part on the logic value.

8. The method of claim 1, further comprising:
reading data from a memory device as part of a read operation performed on the data; and
refraining from performing an error correction procedure on the data read from the memory device based at least in part on the second set of error control bits.

9. The method of claim 1, further comprising:
storing the data and the second set of error control bits in a memory system.

10. The method of claim 1, wherein each bit of the second set of error control bits corresponds to a first logic value.

11. The method of claim 1, wherein each bit of a first subset of the second set of error control bits is a first logic value and each bit of a second subset of the second set of error control bits is a second logic value, the second subset comprising one bit.

12. The method of claim 1, wherein the first set of error control bits is for correcting errors associated with the data received from the host device over a link and the second set of error control bits is for correcting errors associated with reading data stored at a memory device or for correcting errors associated with data sent to the host device over the link.

13. The method of claim 1, wherein the uncorrectable error comprises a multi-bit error in the data.

14. An apparatus, comprising:
a memory device coupled with a host device; and
a controller associated with the memory device, wherein the controller is configured to cause the apparatus to:
receive, from the host device, a write command, data, and a first set of error control bits for the data, the data and the first set of error control bits being associated with the write command;
determine that the data includes an uncorrectable error using the first set of error control bits in response to receiving the data and the first set of error control bits;
generate a second set of error control bits for the data based at least in part on determining that the data includes the uncorrectable error, wherein the second set of error control bits indicate that the data received from the host device included the uncorrectable error; and
transmit, to the host device, the data and an indication that the data received from the host device included the uncorrectable error based at least in part on the second set of error control bits.

15. The apparatus of claim 14, wherein transmitting the indication that the data received from the host device included the uncorrectable error is configured to cause the apparatus to:
transmit, to the host device, the second set of error control bits over a channel associated with communicating error control information.

16. The apparatus of claim 14, wherein the controller is further configured to cause the apparatus to:
generate a single bit indicator flag based at least in part on the second set of error control bits, wherein the indication that the data received from the host device included the uncorrectable error comprises the single bit indicator flag.

17. The apparatus of claim 14, wherein transmitting the indication that the data received from the host device included the uncorrectable error is configured to cause the apparatus to:
transmit the indication that the data received from the host device included the uncorrectable error via a first channel, the first channel different from a data channel and a channel associated with communicating error control information.

18. The apparatus of claim 14, wherein the controller is further configured to cause the apparatus to:
receive, from the host device, a read command for the data, wherein
transmitting the data and the indication that the data received from the host device included the uncorrectable error is based at least in part on the read command.

19. The apparatus of claim 14, wherein the controller is further configured to cause the apparatus to:
store a bit at a register of the memory device, wherein a logic value of the bit is based at least in part on determining that the data includes the uncorrectable error.

20. The apparatus of claim 19, wherein the controller is further configured to cause the apparatus to:
read the second set of error control bits stored in the memory device as part of a read operation performed on the data; and
read the logic value of the bit stored at the register based at least in part on the second set of error control bits indicating the uncorrectable error, wherein transmitting the indication that the data received from the host device included the uncorrectable error is based at least in part on the logic value.

21. The apparatus of claim 14, wherein the controller is further configured to cause the apparatus to:
read data from the memory device as part of a read operation performed on the data; and
refrain from performing an error correction procedure on the data read from the memory device based at least in part on the second set of error control bits.

22. The apparatus of claim 14, wherein the controller is further configured to cause the apparatus to:
store the data and the second set of error control bits in a memory system.

23. The apparatus of claim 14, wherein each bit of the second set of error control bits corresponds to a first logic value.

24. The apparatus of claim 14, wherein the uncorrectable error comprises a multi-bit error in the data.

25. A non-transitory computer-readable medium storing code, the code comprising instructions executable by a processor to:

receive, from a host device, a write command, data, and a first set of error control bits for the data, the data and the first set of error control bits being associated with the write command;

determine that the data includes an uncorrectable error using the first set of error control bits in response to receiving the data and the first set of error control bits;

generate a second set of error control bits for the data based at least in part on determining that the data includes the uncorrectable error, wherein the second set of error control bits indicate that the data received from the host device included the uncorrectable error; and transmit, to the host device, the data and an indication that the data received from the host device included the uncorrectable error based at least in part on the second set of error control bits.

* * * * *